United States Patent [19]

Zinder

[11] 4,141,578
[45] Feb. 27, 1979

[54] HOLDER STICK FOR A CONFECTIONARY PRODUCT

[76] Inventor: Victor Zinder, 301 Westham Pkwy., Richmond, Va. 23229

[21] Appl. No.: 853,378

[22] Filed: Nov. 21, 1977

[51] Int. Cl.² .............................................. A23P 1/00
[52] U.S. Cl. ...................................... 294/61; 426/134
[58] Field of Search ................. 294/61, 515; 426/134, 426/75, 104; 30/322; 46/116; D1/22, 15

[56] References Cited

U.S. PATENT DOCUMENTS

| | | | |
|---|---|---|---|
| 1,813,292 | 7/1931 | Hord | 294/61 |
| 3,290,157 | 12/1966 | Schwartz | 426/134 |

Primary Examiner—James B. Marbert
Attorney, Agent, or Firm—Norman B. Rainer

[57] ABSTRACT

An integral straight rigid holder stick is provided for use in making confectionary products, especially candy apples. The stick, fabricated of an injection moldable thermoplastic resin, has a handle portion, a gripping portion, and a tapered end portion. Because of its novel configuration, the gripping portion securely holds the apple or other confectionery product and minimizes the potential accident hazard due to rolling underfoot when the stick is carelessly discarded on a flat surface. The tapered end portion has a configuration which facilitates insertion of the stick into an apple, yet minimizes the potential hazard of puncture wounds.

10 Claims, 6 Drawing Figures

HOLDER STICK FOR A CONFECTIONARY PRODUCT

BACKGROUND OF THE INVENTION

This invention relates to an improved holder stick for confectionery products, and more particularly to improvements in a holder stick utilized with a confectionery product known as a candy apple.

A candy apple consists of an edible apple of the botanical family and genus Rosacea Pyrus, containing a hard, glazed coating of a generally red colored sugar-containing composition, and mounted on a holder stick. The candy apple is generally made by mounting a suitable apple on a holder stick, inverting and immersing the apple in a molten coating composition, withdrawing the apple, and applying a rotating motion to the stick which causes the cooling composition on the turning apple to form a reasonably uniform coating. The mounting of the apple on the stick is generally accomplished by causing a pointed end of the stick to enter the depression at either the top stem portion of the apple or the bottom of the apple, and inserting the stick a major distance through the apple within its core region.

Because they are perishable, candy apples are not usually manufactured in large numbers by machines or in special factories. Instead, they are generally hand-fabricated by the vendor on an essentially as-needed basis.

Holder sticks that have been utilized in the past have been wooden dowels conically tapered at one end to form a point. The point has constituted a safety hazard, particularly with respect to puncture wounds of the mouth or throat which may be sustained by a child who might fall with the stick in his mouth, or be otherwise struck during play in a manner causing force to be applied to the stick. The pointed sticks, after consumption of the apple, might also be retained by a child during play, and could cause eye injury to himself or others. Injury from splinters can also occur from wooden sticks. The holder sticks, after consumption of the apple, are sometimes carelessly discarded. This constitutes a slipping hazard because a round wooden dowel will roll underfoot, particularly on a flat floor surface.

The roundness of the earlier wooden dowel has also caused the apple to be poorly gripped by the stick. This causes problems during production of the candy apple because the inverted apple may slide off the stick and fall into the molten composition, or fail to rotate when the stick is turned; and it inconveniences the consumer because the apple may rotate about the stick, or may unexpectedly fall off the stick.

Improved holder sticks for various confectionery products have been previously disclosed. The following exemplary references and their shortcomings with respect to achieving the objectives of the present invention may be cited:

U.S. Pat. No. 1,623,926 to Kohler relates to a holder fabricated from a tubular member. The device, intended for use with frozen confections, and having no point or tapered end portion, is not capable of being forced into an apple.

U.S. Pat. No. 1,593,858 to Venable concerns a stick for use in holding a frozen confection such as ice cream. The several disclosed embodiments have pointed tips capable of causing injury to the user. Venable exemplifies round sticks capable of rolling underfoot, and flat sticks which could not be rotated by finger manipulation in the production of candy apples.

U.S. Pat. No. 2,469,589 to Barricini relates to an elastomeric stick for supporting confections such as candy and ice cream. Because the Barricini stick is non-pointed, non-rigid and not possessed of a round handle portion, it cannot be utilized for making candy apples.

U.S. Pat. No. 3,498,808 to Wagner concerns a flat stick used as a holder primarily for molded ice cream confections. The stick, being flexible and rounded at both ends could not be readily inserted into an apple. Neither does it provide a handle which can be rapidly rotated by finger manipulation.

It is accordingly an object of the present invention to provide an improved holder stick for a candy apple. It is another object to provide a holder stick having sufficient rigidity, and suitable shape on at least one end to penetrate an apple, without being pointed so as to be capable of readily inflicting puncture wounds to humans. A further object is to provide a holder stick having improved ability to securely hold an apple so as to minimize pivotal movement about said stick and sliding movement coaxial with said stick, and having reduced rolling tendency on a flat surface. Still another object of this invention is to provide a holder stick having a visibly discernible characteristic useful in gaging the depth to which said stick is inserted into an apple. Other objects and advantages will become apparent hereinafter.

SUMMARY OF THE INVENTION

An integral holder stick for a confectionery product is provided fabricated of an injection moldable high melting thermoplastic resin and having a straight center axis, a handle portion, a tapered end portion at an extremity of said stick, and a gripping portion disposed between said handle portion and said tapered end portion. The handle portion has the general configuration of a right circular cylinder coaxial with said center axis. The gripping portion has a substantially cylindric or prismatic configuration, the cross-sectional configuration of which, taken in a plane perpendicular to said center axis, is a non-circular closed loop or polygon having four points of maximum extension from said center axis interconnected by straight or curved lines, said points being equi-angularly spaced on a circular locus about said center axis. When projected parallel to said axis, the points of maximum extension of said cross sectional configuration form straight edges parallel to said center axis, and said connecting lines form the surfaces which constitute said gripping portion.

The handle and gripping portions are coaxial, each portion being an integral continuous extension of the other. The tapered end portion contains a curved edge extending between two diagonally opposed straight edges, said curved edge being coplanar with said axis and formed by the intersection of two surfaces at an angle of between about 30° and 130°. In preferred embodiments, said curved edge follows a circular path for about 180° of circular arc.

DETAILED DESCRIPTION OF THE INVENTION

Figure 1:
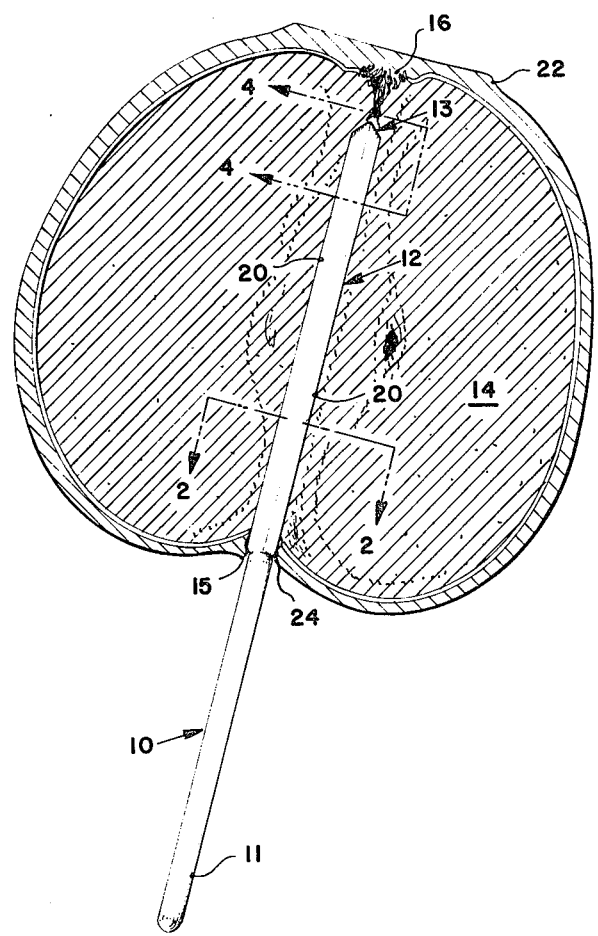
FIG. 1 illustrates a candy apple containing a holder stick of the present invention.

Referring to FIG. 1, a holder stick 10 of the present invention, having a straight center axis and comprising a handle portion 11, gripping portion 12 and tapered end portion 13, is shown inserted into the stem depression 15 at the top of apple 14 which contains coating 22.

Figure 6:
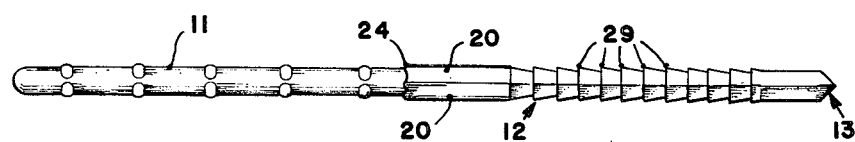
FIG. 6 is a longitudinal side view of another embodiment of holder stick of the present invention.

Gripping portion 12 is comprised of four substantially identical flat elongated faces 20 which intersect perpendicularly at straight edges 17, 17', 27, 27', parallel to said center axis, thereby forming a prismatic structure having a square cross sectional configuration which is constant throughout said gripping portion. In a preferred embodiment, shown in FIG. 6, the faces 20 of gripping portion 12 are provided in part with a raised anisotropic topography in the form of a series of uniform wedge-like projections 29 arranged as a saw-tooth pattern aligned such that the frictional resistance toward insertion of the stick into an apple will be less than the frictional resistance upon withdrawal of the stick from the apple. By virtue of the frictional opposition toward removal of the stick, the apple is gripped more securely with respect to sliding movement which would cause disengagement of the apple from the stick.

The gripping portion of the holder stick has a configuration which in general may be geometrically defined as a closed right cylindric surface, namely a surface traced by a straight line moving parallel to a fixed straight line and continually and perpendicularly intersecting a fixed closed curve. The moving line, or generator, in any one of its positions is called an element of the surface. The guiding curve is called the directrix. When the directrix is a polygon, the surface formed will be composed of planes, and may be called a prismatic surface. The configuration of the gripping portion may be a closed right cylindric surface, a closed right prismatic surface, or combinations thereof. The cross-sectional configuration of the gripping portion, taken in planes perpendicular to the center axis of the holder stick is therefore substantially constant and congruent to the directrix. However, gripping portions comprised of contiguous segments exhibiting a discontinuity in shape, are also contemplated as being within the purview of this invention.

Said cross-sectional configuration, or directrix of the gripping portion of the holder stick is non-circular, having four points of maximum extension from the center axis, about which said points of maximum extension are equi-angularly spaced. As shown in FIG. 3, the points of maximum extension 17, 17', 27, 27' lie on a circular locus 18 having a center 19. The sides 20 which connect points 17, 17', 27, 27' to form a closed loop are either straight lines, as shown in FIGS. 1, 2, 4, 5 and 6, or concavely curved lines as shown in FIG. 3, or lines having both straight and curved sections. It is preferred that, in any particular embodiment, all the sides 20 be identically configured. When vertically projected, the sides 20 form the outer surface of the gripping portion of the holder stick, the center 19 becomes the longitudinal center axis of the stick, and the points 17, 17', 27, 27', become straight edges parallel with said center axis.

Figure 2:
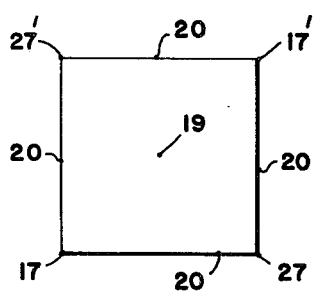
FIG. 2 is a transverse sectional view taken along the line 2—2 of FIG. 1.
Figure 3:
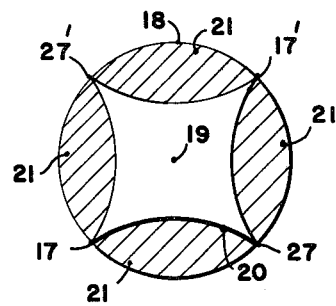
FIG. 3 is a transverse sectional view of another embodiment of holder stick of the present invention.
Figure 4:
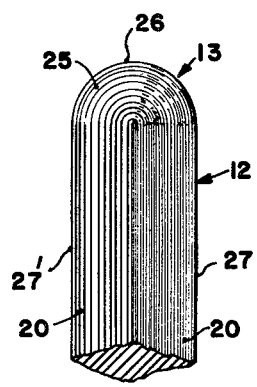
FIG. 4 is an enlarged view of the tapered end portion taken along the line 4—4 of FIG. 1.

Because of this characteristic, the features of sectional FIGS. 2 and 3 are numbered to correspond with the projected features. It has been found that, if the sides 20 are convex, or if there are more than four points of maximum extension, the holder stick will lose its ability to grip the apple, and will have a tendency to roll underfoot on a flat surface.

The cross sectional configuration of the gripping portion is such that its area is less than 75% of the total area of the circle 18 defined by the points 17, 17', 27, 27'. The area of said circle which is unoccupied by the holder stick is shown as the shaded regions 21 in FIG. 3. Said regions 21, which occupy at least 25% of the area of the circle, will in use be occupied by portions of the apple. The greater the volume of apple contained within this region of the gripping portion, the greater will be the resistance of the apple toward pivotal movement about the stick.

The terminus of the tapered end portion 13 is an edge 26 contoured as a curved line coplanar with the axis of the holder stick and traversing between diagonally opposed straight edges 27 and 27'. The edge 26 represents the locus of intersection of opposed conical surfaces 25 having apexes at diagonally opposed straight edges 17 and 17'. In the embodiment of tapered end portion illustrated in FIGS. 4 and 5, curved edge 26 is circular, having essentially 180° of circular arc. If the manner of producing the curved edge were to be extended so that said edge would have 360° of circular arc, there would be produced a shape which might be characterized as two congruent cones attached base to base. The conical surfaces 25 of the embodiment of FIG. 5, when viewed in transverse section perpendicular to curved edge 26, approach edge 26 as straight lines, thereby defining Angle A.

It has been found in general that, to accomplish the objectives of the present invention, Angle A should be within the range of about 30° to 130°. At angles smaller than about 30°, the stick may be capable of inflicting injuries to the user. At angles greater than about 130°, the stick may require excessive force for insertion into an apple. Another factor which enhances the ease with which the tapered end portion penetrates the apple is the smooth, low friction surface of the plastic stick. In preferred embodiments, the holder stick should enter the apple using an applied pushing force of less than about 20 pounds. In comparison with a holder stick having a squared-off end, or essentially an angle A of 180°, the tapered end portion functions to achieve at least a 10% reduction in required pushing force. The required pushing force for a holder stick of the present invention is generally at least about 20% less than the pushing force required by pointed, round wooden dowel holder sticks of the prior art.

Figure 5:
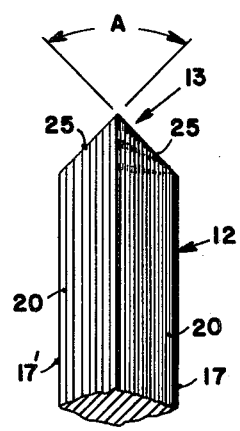
FIG. 5 is a view of the end portion of FIG. 4 rotated 90° about the center axis.

The tapered end portion of the holder stick is in general less than ½ inch in length, and preferably less than ⅜ inch long. The area of the transverse section of the tapered end portion diminishes continuously, approaching zero area at the terminus of the stick. The geometric configuration of the taper is preferably of a linear or convex nature. A linear taper may be characterized as one wherein the converging surfaces 25, viewed in transverse section perpendicular to curved edge 26, are straight lines. An exemplary linear taper is illustrated in FIG. 5. A convex taper may be characterized as one providing more transverse-sectional area at a given point along the axis of the stick than would be provided by a linear taper of the same general dimensions.

Because of the low friction nature of the surface of the plastic holder stick, manipulation of the handle portion during the spinning of the apple may sometimes be difficult. In a preferred embodiment therefore, the handle portion is provided with a roughened surface characterized by having either a random roughening or a series of ridges coextensive with the axis of the stick, or a polygonal cross-sectional shape approaching circular. In some embodiments, raised annular rings may also be provided on the surface of the handle portion.

When utilized in making a candy apple, the holder stick is entered into an apple by inserting the tapered end portion 13 into either the depression 15 in the top stem portion of the apple, or in the opposite depression 16. The stick is then forced into the core of the apple until essentially all of the gripping portion is embedded within the apple. However, the actual degree of penetration into the apple may be adjusted in accordance with the size of the apple. The determination of degree of penetration of the holder stick of this invention is facilitated by observance of the visually apparent transition zone 24 between the handle portion and gripping portion.

Once mounted on the holder stick, the combination, being hand-held by handle portion 11, is then inverted and dipped into a molten confectionery composition, withdrawn, and spun by said handle portion about the center axis of the holder stick. The spinning action promotes formation of a uniform coating of the cooling confectionery composition, and also removes excess coating composition.

Because the molten composition may have temperatures higher than 250° F., the polymer material of which the holder stick is fabricated should have a melting point above 250° F., and preferably above 300° F. Suitable polymers include addition polymers such as high impact polystyrenes, and polymers of acrylonitrile; and condensation polymers such as polyamides, polyesters and polyoxymethylene. Such polymers are available as pelleted molding resin compositions which may be used to fabricate the holder stick by an injection molding operation. Light-colored molding compositions are preferably because of the more appealing appearance they present in contrast with the usually red apple.

Since a certain amount of force is required to push the holder stick into the apple, the stick must be rigid. For the purpose of defining rigidity, it has been found convenient to test the holder stick in the following manner: A holder stick is positioned horizontally over two parallel knife edge supports spaced 4.5 inches apart and disposed perpendicular to the center axis of the stick. A 1 pound weight is suspended from the holder stick at the mid-point between said supports, and the extent of deflection of the stick is measured. For a holder stick to be considered sufficiently rigid for its intended purpose in the practice of this invention, a vertically measured deflection of less than ⅛ inch will be produced by the aforesaid test.

The total length of the stick is between about 5 and 7 inches, and its thickness is such that no cross-sectional dimension taken in a plane perpendicular to the center axis of the stick will exceed ⅜". The handle portion 11 and gripping portion 12 may each occupy from 40% to 60% of the entire length of the holder stick.

In use, the holder stick of this invention may also be utilized as a holder for a banana, frankfurter, caramel coated apple or frozen confectionery product such as ice cream.

While particular examples of the present invention have been shown and described, it is apparent that changes and modifications may be made herein without departing from the invention in its broadest aspects. The aim of the appended claims, therefore, is to cover all such changes and modifications as fall within the true spirit and scope of the invention.

Having thus described my invention, what is claimed is:

1. An integral rigid holder stick fabricated of an injection moldable thermoplastic resin having a melting point above 250° F. and comprising a straight center axis, a handle portion, a tapered end portion at an extremity of said stick, and a gripping portion disposed between said handle portion and said tapered end portion, said handle portion having the configuration of essentially a right circular cylindric surface coaxially disposed with respect to said center axis, said gripping portion having the configuration of a non-circular right cylindric or prismatic surface or combinations thereof having four straight edges parallel to said center axis and equi-angularly and equi-distantly spaced therefrom, the terminus of said tapered end portion being a curved edge coplanar with said center axis and formed by the intersection of two curved surfaces at an angle between about 30° and 130°.

2. The holder stick of claim 1 wherein said handle and gripping portions each occupy between 40% and 60% of the total length of said stick, said total length being between 5 and 7 inches.

3. The holder stick of claim 1 wherein said tapered end portion is less than ⅜ inch long.

4. The holder stick of claim 1 wherein the contour of the perpendicular cross section of said gripping portion has four points of maximum extension from a central point about which said points of maximum extension are equi-angularly spaced, said points of maximum extension lying on a circular locus about said central point which when projected constitutes the center axis of said stick.

5. The holder stick of claim 4 wherein the perpendicular cross sectional area of said gripping portion occupies less than 75% of the area of said circular locus.

6. The holder stick of claim 1 wherein said gripping portion is comprised of four elongated substantially flat surfaces disposed symmetrically about said center axis and perpendicularly intersecting to form straight edges parallel to said axis and equidistant therefrom.

7. The holder stick of claim 6 wherein said curved edge has the configuration of a circular arc.

8. The holder stick of claim 7 wherein said circular arc extends for about 180°, spanning two diagonally opposed straight edges of said gripping portion.

9. The holder stick of claim 8 wherein said two curved surfaces are conical surfaces, the apexes of which are positioned at two diagonally opposed straight edges of said gripping portion other than the straight edges spanned by said curved edge.

10. The holder of claim 1 wherein the gripping portion has a substantially prismatic surface having a raised anisotropic topography arranged such that the frictional resistance toward insertion of said stick into an apple is less than the frictional resistance upon withdrawal of the stick from the apple.

* * * * *